United States Patent
Kim

(10) Patent No.: US 6,651,328 B2
(45) Date of Patent: Nov. 25, 2003

(54) METHOD FOR MANUFACTURING SLIDING PARTS FOR HERMETIC COMPRESSOR

(75) Inventor: Jong Hyuk Kim, Kyungsangnam-Do (KR)

(73) Assignee: LG Electronics Inc. (KR)

( * ) Notice: Subject to any disclaimer, the term of this patent is extended or adjusted under 35 U.S.C. 154(b) by 62 days.

(21) Appl. No.: 10/005,948

(22) Filed: Dec. 4, 2001

(65) Prior Publication Data

US 2002/0042991 A1 Apr. 18, 2002

(30) Foreign Application Priority Data

Dec. 6, 2000 (KR) .................................... 2000/0073868

(51) Int. Cl.⁷ ................................................ B23P 15/00
(52) U.S. Cl. ............................ 29/888.025; 29/890.09; 419/26; 419/28; 419/29
(58) Field of Search .................... 29/888.02, 888.022, 29/888.024, 888.025, 890.034, 890.035, 889, 889.2; 418/178, 179, 63; 419/26, 28, 29; 148/514

(56) References Cited

U.S. PATENT DOCUMENTS

| | | | | |
|---|---|---|---|---|
| 3,853,602 A | * | 12/1974 | Nakamura | 428/682 |
| 5,087,181 A | * | 2/1992 | Kamitsuma et al. | 418/178 |
| 5,165,870 A | * | 11/1992 | Sato | 417/410.3 |
| 5,364,248 A | * | 11/1994 | Nakashima et al. | 418/178 |

FOREIGN PATENT DOCUMENTS

JP         2003028060 A  *  1/2003

* cited by examiner

Primary Examiner—Charles T. Jordan
Assistant Examiner—T. Nguyen
(74) Attorney, Agent, or Firm—Ostrolenk, Faber, Gerb & Soffen, LLP

(57) ABSTRACT

A method for manufacturing a sliding part for a hermetic compressor is disclosed. Since the abrasion resistance and corrosion resistance of the sliding part is increased, the energy consumption efficiency is improved and the performance of the compressor can be enhanced. In addition, since the manufacturing process is shortened, the production cost can be reduced and the manufacturing time can be reduced. Moreover, since the thickness change of the sliding part is minimized, the defective rate of the part size can be reduced and its quality can be improved.

6 Claims, 5 Drawing Sheets

METHOD FOR MANUFACTURING SLIDING PARTS FOR HERMETIC COMPRESSOR

BACKGROUND OF THE INVENTION

1. Field of the Invention

The present invention relates to a method for manufacturing a sliding part for a hermetic compressor, and more particularly, to a method for manufacturing a sliding part for a hermetic compressor that is capable of improving an abrasion resistance of a sliding part and capable of shortening a manufacturing process.

2. Description of the Background Art

FIG. 1 is a sectional view of a general hermetic compressor.

In general, the hermetic compressor includes a hermetic case 6 in which a suction pipe 2 into which fluid is sucked from an external source and a discharge pipe 4 for discharging compressed fluid are connected, a drive unit 8 being disposed at a lower portion of the case 6 and generating a rotational force, and a compressing unit 10 being disposed at an upper portion of the case 6 and compressing the fluid according to the rotational force generated by the drive unit 8.

The drive unit 8 includes a stator 12 being disposed fixed at the inner circumference of the case 6, to which power is applied from an external source, a rotor 14 being disposed at an inner circumference of the stator 12 with a certain distance and rotated by electromagnetic interacting with the stator 12 when power is applied to the stator 12, and a crank shaft 18 being fixed at the rotor 14 and rotated accordingly and supported at a frame 16 fixed at the case 6.

The compression unit 10 includes a connecting rod 20 being connected to the upper end of the crank shaft 18 and making a reciprocating and linear movement according to a rotational movement of the crank shaft 18, a cylinder 22 being disposed fixed at an upper side of the frame 16 and having a space to which a fluid is provided, a piston 24 being connected to the connecting rod 20 for a linear movement together with the connecting rod 20, and slidably disposed inside the cylinder to compress fluid introduced into the cylinder, and a valve assembly 26 being mounted at one side of the cylinder 22 to supply fluid into the cylinder 22 and discharging a coolant compressed by the piston 24.

When such a hermetic compressor is driven for a fluid compression operation, friction is created between the crank shaft 18 and the frame 16, friction is created between the piston 24 and the inner wall of the cylinder 22, and friction is also created between the connecting rod 20 and the crank shaft 18.

Thus, the surface of sliding parts where friction is generated is to be surface-processed to increase lubrication and abrasion resistance.

A method for manufacturing a sliding part of a conventional art will now be described by taking an example of the piston 24.

The piston is manufactured by using a sintering and casting method for a mass production.

First, a method for manufacturing the piston 24 by sintering will now be described with reference to FIG. 2.

A material of ferrite group is pressed to form an exterior and subjected to sintering at a high temperature to obtain a compact organization and increase an adhesiveness between organizations (step S100).

After the sintering process, a steam treatment is carried out to maintain air tightness according to closure of pores formed in the organizations of the sintered product and increase corrosion resistance and abrasion resistance (step S200).

After the steam treatment, a roughing process is performed to process a shape of an inner and outer diameter (step S300).

After the roughing process, in order to improve a surface roughness of the sintered product, a sand blasting process is performed (step S400).

After the sand blasting process, in order to improve lubrication and abrasion resistance on a plastic deformation processed surface, a manganese phosphate coating treatment, a kind of lubricating treatment, is performed to form a coated layer 102 (step S500).

After the manganese phosphate coating process, molybdenum desulfidel treatment serving as a lubricant is carried to form a coated layer 104 at the surface of the piston (step S600).

According to a piston manufacturing method by a casting is that molten metal having a dissolved ferrite-group material is poured in a molding box to process a shape of a piston and then the same process as that of the piston manufacturing method by sintering as described above is performed to finally manufacture a piston.

The manganese phosphate coating process is a kind of phosphate coating process and performed for the purpose of a base of a paint, improvement of abrasion resistance, lubrication of plastic deformation process and electric insulation, for which phosphate solution of various metals is used suitable to the purpose.

For the molybdenum desulfide treatment process, a method is used in which the molybdenum desulfide($MoS_2$) is made to be powders or coated on a surface of the metal by mixing it with grease or oil.

After the piston manufacturing process of the conventional art is completed, as shown in FIG. 3, dual soft-coated layers 102 and 104 are formed at the surface of the piston by the manganese phosphate and molybdenum disulfide.

However, the coated layers 102 and 104 of the piston 24, the soft-coated layer, have a problem that as a predetermined time elapses, a gap (L) is generated due to a friction according to sliding with the cylinder 22, into which a coolant is leaked.

In addition, the conventional method for manufacturing a sliding part for a hermetic compressor has a problem that since the dual surface treatment process that the manganese phosphate treatment process and the molybdenum disulfide treatment process are subsequently performed is carried out, its production cost is increased, and especially, in case of the molybdenum disulfide surface processing, its unit cost is so high that its production cost is inevitably increased.

Moreover, because of the dual process performing the manganese phosphate treatment and the molybdenum disulfide treatment are subsequently performed, the thickness is increased due to the respective surface processing, causing exceeding the tolerance and the size deficiency occurs.

That is, When the thickness is increased in the surface treatment process of the piston, it is difficult to assembly the piston into the cylinder, and the fluid may be leaked due to the irregular surface of the piston in working.

Furthermore, due to the performing of the dual surface treatment of the piston, the size is changed when the piston and a piston pin are assembled, considerably degrading a combination rate, and it is difficult to compute a design size corresponding to the fact that the piston pin is released from the piston.

In addition, since the surface treatment process of the sliding part is dually performed, resultantly, the process is complicated, the manufacturing process duration is increased, and a defective generation rate is increased.

SUMMARY OF THE INVENTION

Therefore, an object of the present invention is to provide a method for manufacturing a sliding part for a hermetic compressor that is capable of simplifying a process and reducing a production cost and working time period by reducing a surface treatment process of a manufacturing process of a sliding part.

Another object of the present invention is to provide a method for manufacturing a sliding part for a hermetic compressor that is capable of facilitating assembling of sliding parts and improving a reliability in operation and abrasion resistance by minimizing a change in the thickness according to a surface treatment of the sliding parts and reducing a tolerance.

To achieve these and other advantages and in accordance with the purpose of the present invention, as embodied and broadly described herein, there is provided a method for manufacturing a sliding part for a hermetic compressor including the steps of: sintering a powder material of a ferrite group and forming a shape of a sliding part; performing a first stream treatment to close air pores formed in the organization of the sliding part after the sintering is finished; performing a roughing process to form an inner diameter and an outer diameter of the sliding part after the first steam treatment of the sliding part is finished; performing a sand blasting process to improve a surface roughness of the sliding part after the roughing process is finished; and performing a second steam treatment to form an oxide coated layer at the surface of the sliding part after the sand blasting process is finished.

In the method for manufacturing a sliding part for a hermetic compressor of the present invention, the step of performing a first steam treatment includes the steps of: conveying the sintering-finished sliding part into a stream furnace; and spraying stream which has been heated to a certain temperature to the conveyed sliding part to close the air pores of the sintered product.

In the method for manufacturing a sliding part for a hermetic compressor of the present invention, the step of performing a second stream treatment includes the steps of: conveying the sand blasting-finished sliding part into a stream furnace; and spraying stream which has been heated to a certain temperature to the surface of the conveyed sliding part to form an oxide coated layer on the surface of the sliding part.

In the method for manufacturing a sliding part for a hermetic compressor of the present invention, the temperature of the stream sprayed to the sliding part is about 500° C.~600° C.

To achieve the above object, there is also provided a method for manufacturing a sliding part for a hermetic compressor including the steps of: pouring a dissolved molten metal of a ferrite group in a molding box to create a cast in a certain form; performing a roughing process to form a shape of an inner diameter and an outer diameter of a cast product after the cast product is completely manufactured; performing a sand blasting process to improve a surface roughness of a sliding part after the roughing process is finished; and performing a stream treatment to form an oxide coated layer at the surface of the piston after the roughing process is finished.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention, are incorporated in, and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments of the method for manufacturing a slide part for a hermetic compressor in accordance with the present invention, of which a preferred embodiment will now be described.

Figure 1:
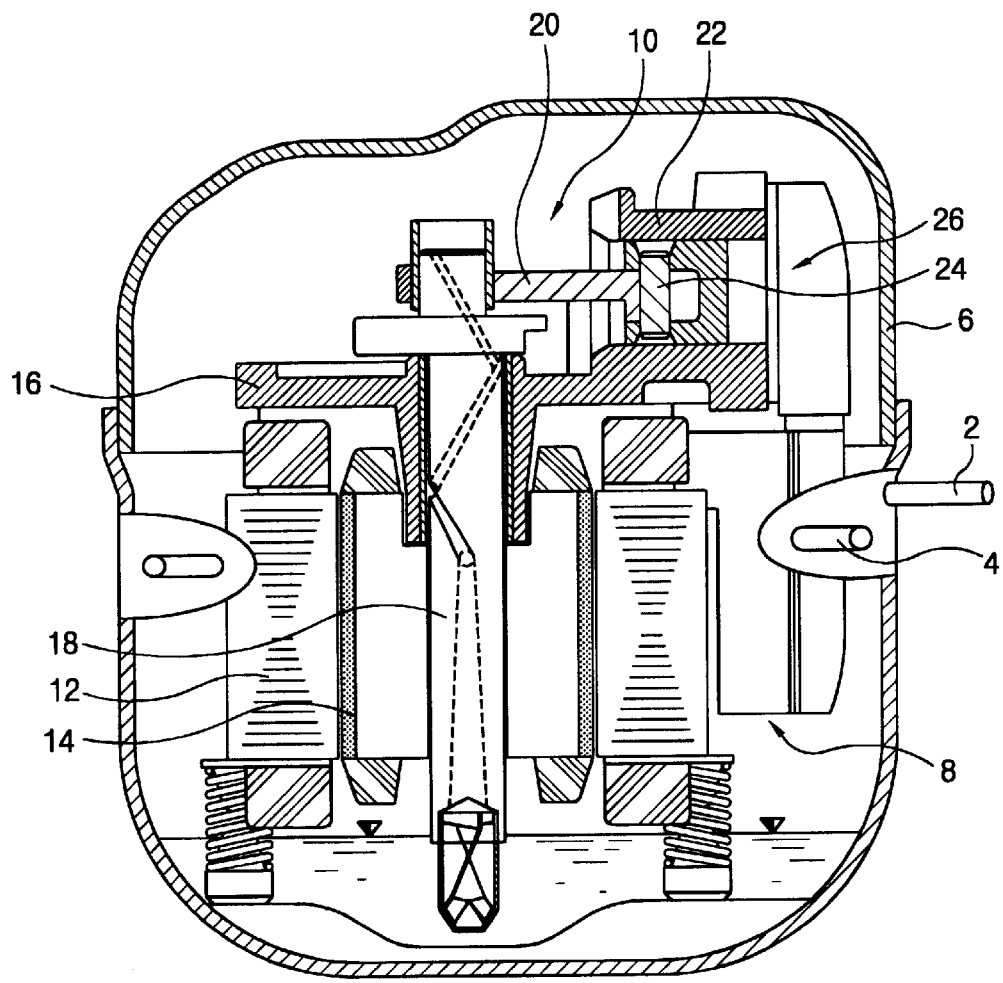
FIG. 1 is a cross-sectional view of a general hermetic compressor.
Figure 2:
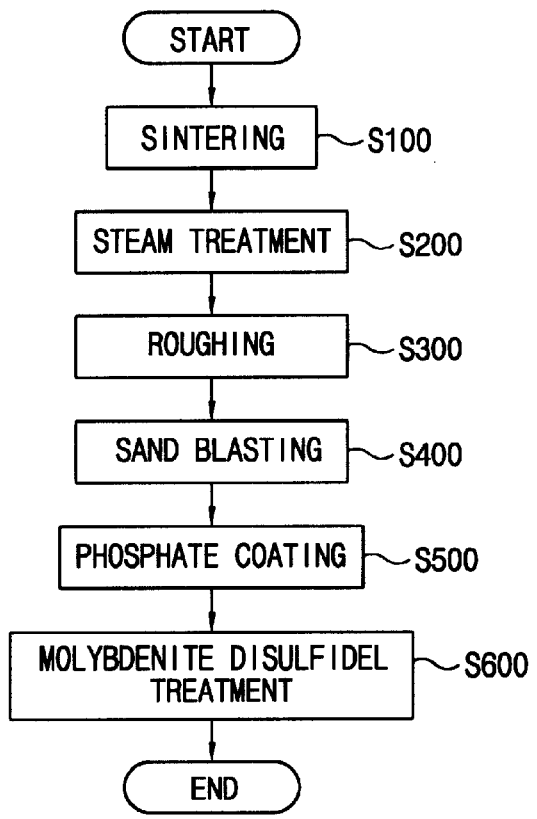
FIG. 2 is a flow chart of a process for fabricating a sliding part of a hermetic compressor in accordance with a conventional art.
Figure 3:
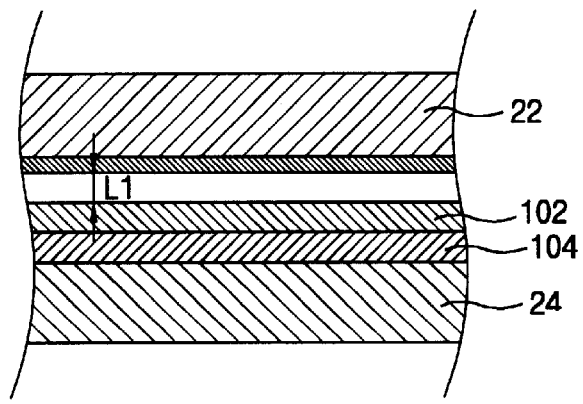
FIG. 3 is a partial sectional view of a piston manufactured by a manufacturing method in accordance with the conventional art.

With reference to FIG. 1, a hermetic compressor of the present invention includes a hermetic case 6 having a suction tube 2 and a discharge tube 4 attached at one side thereof, a drive unit 8 being inserted at a lower portion of the case 6 and generating a rotational force, a compression unit 10 being disposed at an upper side of the case 6, compressing fluid sucked into the suction tube 2 according to the rotational force generated by the drive unit 8 and discharging it to the discharge tube 4, and a crank shaft 18 generating a driving force generated by the drive unit 8 to the compression unit 10.

The compression unit 10 includes a connecting rod 20 being connected at an upper end of the crank shaft 18 and making a reciprocal and linear movement according to a rotational movement of the crank shaft 18, a cylinder 22 a cylinder 22 being disposed fixed at an upper side of the frame 16 supported by the case 6 and having a space to which a fluid is provided, a piston 24 being connected to the connecting rod 20 for a linear movement together with the connecting rod 20, and slidably disposed inside the cylinder to compress fluid introduced into the cylinder, and a valve assembly 26 being mounted at one side of the cylinder 22 to supply fluid into the cylinder 22 and discharging a coolant compressed by the piston 24.

As for the sliding part of the hermetic compressor, friction is generated between the inner wall of the cylinder 22 and the outer circumferential surface of the piston 24 where the cylinder 22 and the piston 24 are slid, between the inner wall of the frame 16 and the outer circumferential surface of the crank shaft 18 where the crank shaft 18 is rotatably supported, and at the connecting portion of the crank shaft 18 and the connecting rod 20.

Such a sliding part are subjected to a surface treatment to increase the strength and abrasion resistance on the surface thereof. In the present invention, a surface treating method of the piston, one of sliding parts will now be described.

Figure 4:
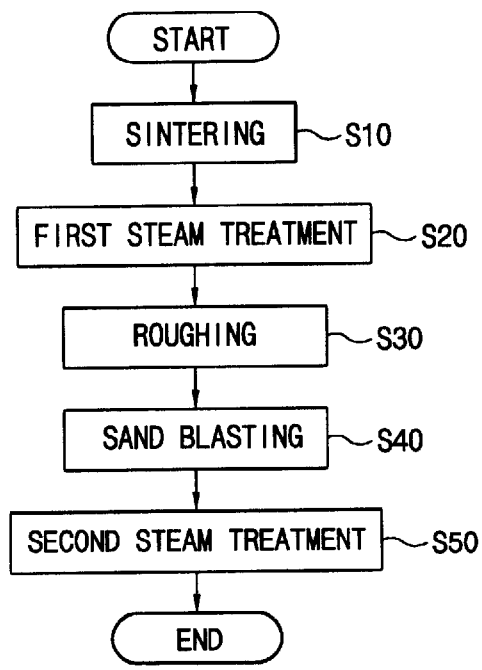
FIG. 4 is a flow chart of a process for fabricating a sliding part for a hermetic compressor in accordance with one embodiment of the present invention.

FIG. 4 is a flow chart of a process for fabricating a sliding part for a hermetic compressor in accordance with one embodiment of the present invention.

First, a powder material of ferrite group is pressurized to form an exterior of a piston 4, and is sintered at a high temperature to increase its tight coupling in organization and better its compactness (step S10).

Besides the sintering method for use to form the exterior of the piston 24, a method for heating and combining powder of ferrite group may be applied and an alloy obtained by mixing a metal component other than the ferrite group component can be used as a powder material.

After the sintering is finished, the air pores formed in the organization of the sintered product are closed and a sream treatment is first performed to maintain air tightness of the organization and increase a corrosion resistance and an abrasion resistance (step S20).

The sintered product which has been first steamed is conveyed into a steam furnace. Steam heated to a temperature higher than a predetermined level is sprayed to the sintered product, which is conveyed inside the steam furnace, to close the air pores. That is, spraying steam of high temperature to the sintered product help oxidize the sintered product and close the air pores, bettering the airtightness of the sintered product.

The temperature of the sprayed stream is about 500° C.~600° C.

When the steam treatment of the sintered product is completed, a roughing process is performed to form an inner diameter and an outer diameter of the piston (step S30).

The roughing process is to make a form of an inner and outer diameter such as the hole of the piston 24 into which a piston pin is to be inserted and an inner diameter into which the connecting rod 20 is inserted. The roughing process is performed by using a CNC or an automatic shelf.

After the roughing process is completely performed on the piston, a sand blasting process is performed to improve a roughness (step S40).

The roughing process-completed piston 24 has a rough surface, so that when the piston is slid on the inner wall of the cylinder 22, a friction is generated or airtightness is degraded. In order to solve this problem, the sand blasting process is performed to super-finish the surface of the piston.

After the sand blasting process is completed, a second steam treatment is performed to form an oxide coated layer at the surface of the piston 24.

The second steam treatment is performed in a manner that the sandblasting-completed piston 22 is injected into the steam furnace and passes a plurality of sections of the steam furnace where steam of above a predetermined temperature is sprayed so that Fe3O4 hard coated layer is formed at the surface of the piston 24 to thereby improve the abrasion resistance and corrosion resistance. At this time, the temperature of the steam is about 500° C.~600° like in the first steam treatment.

Figure 5:
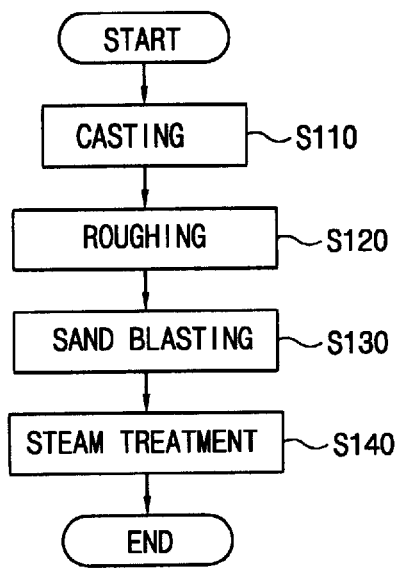
FIG. 5 is a flow chart of a process for fabricating a sliding part for a hermetic compressor in accordance with another embodiment of the present invention.

FIG. 5 is a flow chart of a process for fabricating a sliding part for a hermetic compressor in accordance with another embodiment of the present invention.

A method for fabricating a sliding part for a hermetic compressor in accordance with another embodiment of the present invention will now be described by a method for fabricating the piston 24 by casting.

First, molten metal of ferrite group is poured in a molding box with a certain form to make a cast in a piston form (step S10).

After the cast is completely manufactured, a roughing process is performed to form the configuration of an inner diameter and an outer diameter of the piston 24 (step S20).

After the roughing process is completed, a sand blasting process is performed to improve a roughness at the surface of the piston 24 (step S30).

After the sand blasting process is completed, a steam treatment is performing on the surface of the piston 24 to form an oxide coated layer (step S40).

The steam treatment is performed to form a coated layer on the surface of the piston 24 for which the sand blasting process has been completed. In the steam treatment, the piston 24 is injected into the steam furnace and a high temperature steam of above 400° C. is sprayed thereto, so that the oxide coated layer of $Fe_3O_4$ is formed on the surface of the piston 24.

Besides, the piston manufacturing method, other sliding parts such as the crankshaft and the connecting rod are manufactured in the same manner.

According to a test result, those sliding parts manufactured in accordance with the embodiment of the present invention exhibit excellent reliability as well as abrasion resistance and energy consumption efficiency compared to those manufactured by the existing method.

The test result of the sliding parts of the present invention will now be described.

Figure 6:
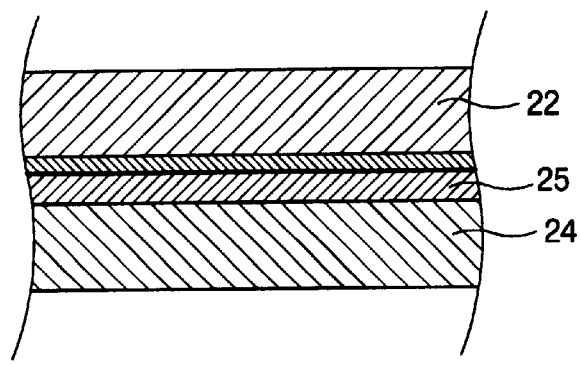
FIG. 6 is a partial sectional view showing a piston of a hermetic compressor manufactured according to the manufacturing process in accordance with a preferred embodiment of the present invention.

FIG. 6 is a partial sectional view showing a piston of a hermetic compressor manufactured according to the manufacturing process in accordance with a preferred embodiment of the present invention.

A hard coated layer 25 is formed at the surface of the piston manufactured according to the present invention, so that an abrasion amount according to friction with respect to the inner wall of the cylinder is very small. Thus, as the piston is maintained in a closely adhered to the inner side of the cylinder thanks to the oil film, coolant leakage is minimized.

That is, the abrasion amount due to the friction of the sliding part manufactured according to the manufacturing method of the present invention is smaller than the abrasion amount due to friction of the sliding part manufactured according to the conventional manufacturing method, leakage prevention effect of the former is remarkably better than the latter.

Figure 7:
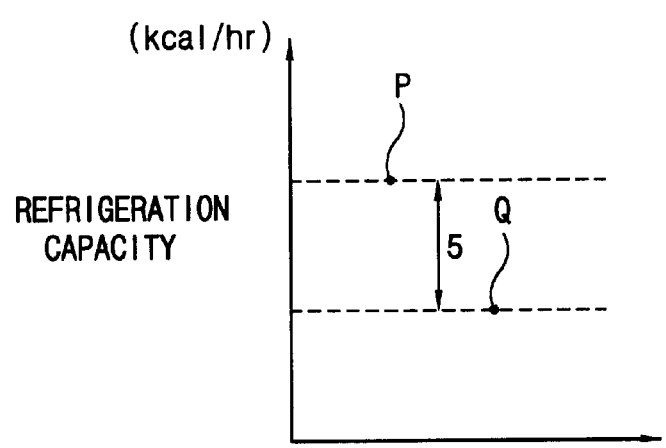
FIG. 7 is a graph showing a comparison of a refrigeration capacity of the hermetic compressor in accordance with the preferred embodiment of the present invention and that of the conventional art.

FIG. 7 is a graph showing a comparison of a refrigeration capacity of the hermetic compressor in accordance with the preferred embodiment of the present invention and that of the conventional art.

As shown in FIG. 7, there is about 5 Kcal/Hr difference between a refrigeration capacity (P) of the compressor adopting the sliding part manufactured by the manufacturing method according to the present invention and that of the compressor adopting the sliding part manufactured by the conventional manufacturing method.

Figure 8:
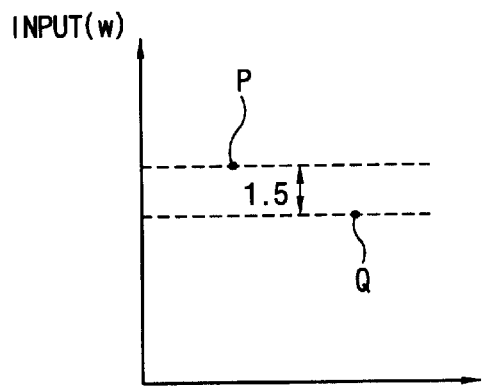
FIG. 8 is a graph showing a comparison of an electric consumption amount of the hermetic compressor in accordance with the preferred embodiment of the present invention and that of the conventional art.

FIG. 8 is a graph showing a comparison of an electric consumption amount of the hermetic compressor in accordance with the preferred embodiment of the present invention and that of the conventional art.

As shown in FIG. 8, there is about 1.5W difference in its input value between an electricity consumption amount (P) of the compressor adopting the sliding part manufactured by the manufacturing method according to the present invention and an electricity consumption amount (Q) of the compressor adopting the sliding part manufactured by the conventional manufacturing method.

Figure 9:
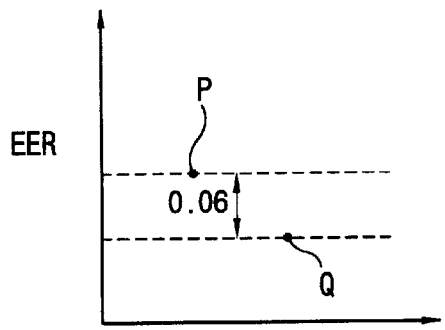
FIG. 9 is a graph showing a comparison of an energy consumption efficiency of the hermetic compressor in accordance with the preferred embodiment of the present invention and that of the conventional art.

FIG. 9 is a graph showing a comparison of an energy consumption efficiency of the hermetic compressor in accordance with the preferred embodiment of the present invention and that of the conventional art.

The energy consumption efficiency is expressed by EER, indicating an input power-to-refrigeration capacity as a numerical value.

As shown in FIG. 9, there is about 0.06EER difference between the energy consumption efficiency (P) of the present invention and the energy consumption efficiency (Q) of the conventional art.

That is, increase in the energy consumption efficiency of the present invention signifies the airtightness and reliability according to the improvement of the abrasion resistance of the piston.

Figure 10:
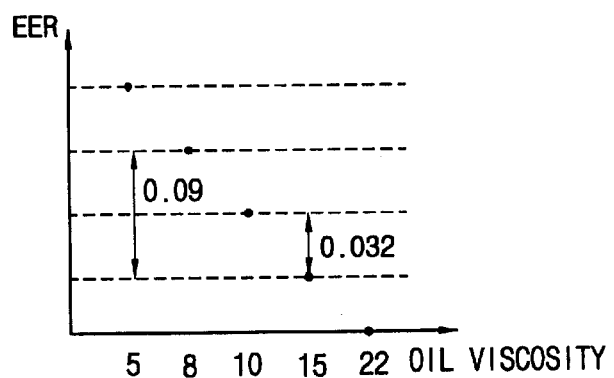
FIG. 10 is a graph showing a comparison of a performance change rage by oil viscosity of the hermetic compressor in accordance with the preferred embodiment of the present invention and that of the conventional art.

FIG. 10 is a graph showing a comparison of a performance change rage by oil viscosity of the hermetic compressor in accordance with the preferred embodiment of the present invention and that of the conventional art, in which the horizontal side indicates numerical values by oil viscosity and the vertical side indicates the energy consumption efficiency.

As shown in FIG. 10, the compressor adopting the sliding part of the present invention attains a reliability even when the oil viscosity is in the range of 8 to 10. Thus, since oil with a low viscosity can be adopted for use, the energy consumption efficiency can be increased as much.

Meanwhile, in the case of the conventional art, if oil viscosity is low, since its reliability is not ensured, a product with viscosity of about 15 is to be used, and accordingly, its energy consumption efficiency (Q) is degraded as much.

As so far described, the method for manufacturing a sliding part for a hermetic compressor has many advantages.

That is, for example, first, since the abrasion resistance and corrosion resistance of the sliding part is increased, the energy consumption efficiency is improved and the performance of the compressor can be enhanced.

Secondly, since the manufacturing process is shortened, the production cost can be reduced and the manufacturing time can be reduced.

Thirdly, since the thickness change of the sliding part is minimized, the defective rate of the part size can be reduced and its quality can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for manufacturing a sliding part for a hermetic compressor comprising the steps of:

sintering a powder material of a ferrite group and forming a shape of a sliding part;

performing a first stream treatment to close air pores formed in the organization of the sliding part after the sintering is finished;

performing a roughing process to form an inner diameter and an outer diameter of the sliding part after the first steam treatment of the sliding part is finished;

performing a sand blasting process to improve a surface roughness of the sliding part after the roughing process is finished; and performing a second steam treatment to form an oxide coated layer at the surface of the sliding part after the sand blasting process is finished.

2. The method of claim 1, wherein the step of performing a first steam treatment comprises:

conveying the sintering-finished sliding part into a stream furnace; and spraying stream which has been heated to a certain temperature to the conveyed sliding part to close the air pores of the sintered product.

3. The method of claim 1, wherein the step of performing a second stream treatment comprises:

conveying the sand blasting-finished sliding part into a stream furnace; and spraying stream which has been heated to a certain temperature to the surface of the conveyed sliding part to form an oxide coated layer on the surface of the sliding part.

4. The method of claim 1, wherein the temperature of the stream sprayed to the sliding part is about 500° C.~600° C.

5. The method of claim 2, wherein the temperature of the stream sprayed to the sliding part is about 500° C.~600° C.

6. The method of claim 3, wherein the temperature of the stream sprayed to the sliding part is about 500° C.~600° C.

* * * * *